Oct. 21, 1969  N. W. CROSBY ET AL  3,474,184
SPACER DAMPER
Filed Dec. 9, 1968  2 Sheets-Sheet 1
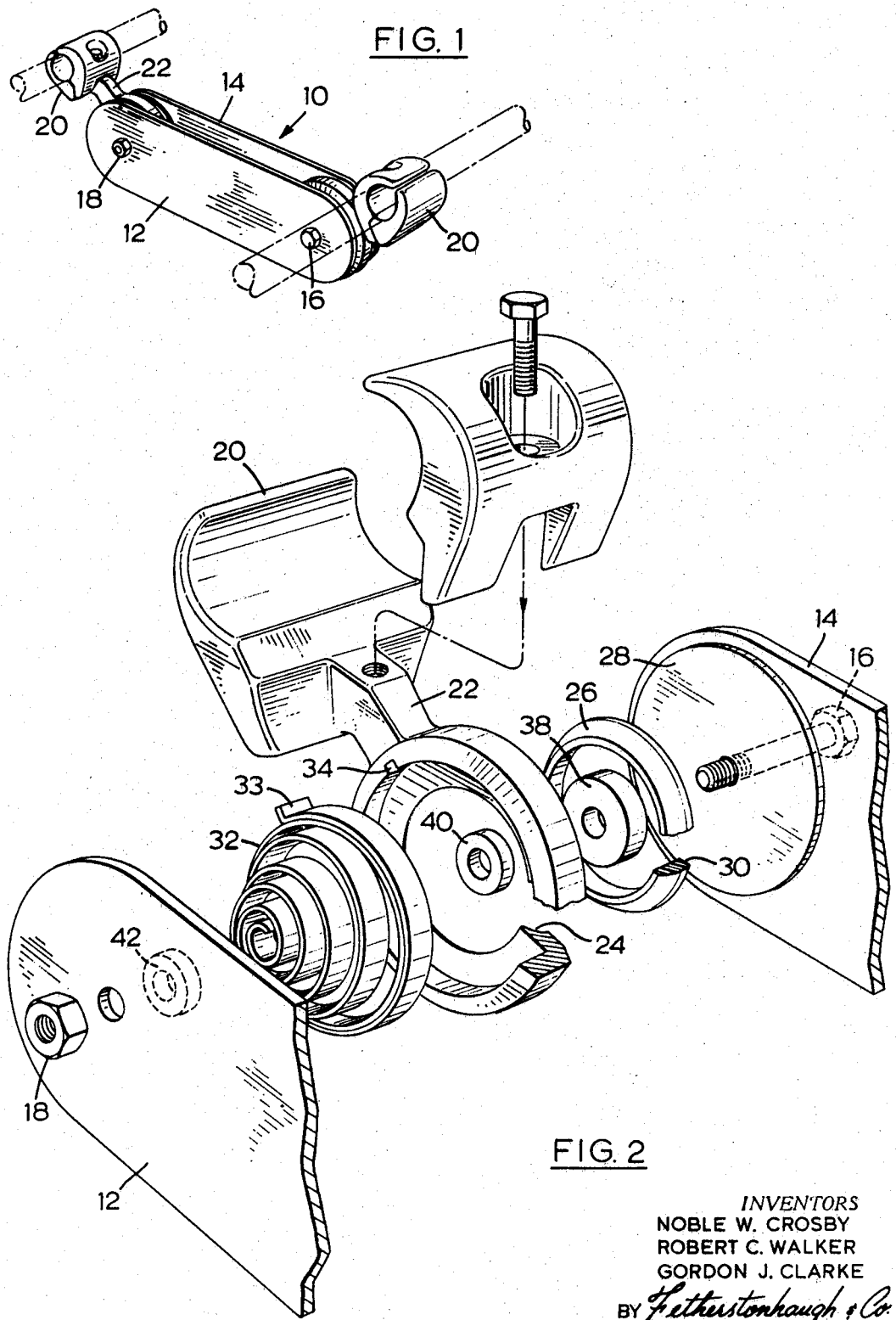
INVENTORS
NOBLE W. CROSBY
ROBERT C. WALKER
GORDON J. CLARKE
BY *Featherstonhaugh & Co.*
ATTORNEYS Oct. 21, 1969   N. W. CROSBY ET AL   3,474,184
SPACER DAMPER
Filed Dec. 9, 1968   2 Sheets-Sheet 2

INVENTORS
NOBLE W. CROSBY
ROBERT C. WALKER
GORDON J CLARKE
BY Featherstonhaugh & Co.
ATTORNEYS United States Patent Office 3,474,184
Patented Oct. 21, 1969

3,474,184
SPACER DAMPER
Noble W. Crosby, Trenton, Ontario, Robert C. Walker, Newmarket, Ontario, and Gordon J. Clarke, Bramalea, Ontario, Canada, assignors to Lacal Industries Limited, Newmarket, Ontario, Canada
Filed Dec. 9, 1968, Ser. No. 782,360
Int. Cl. H02g 7/14; F16d 49/02; H01b 17/00
U.S. Cl. 174—42                                           5 Claims

ABSTRACT OF THE DISCLOSURE

The invention is a damper for aeolian and subconductor vibration of electricity conductor lines wherein the energy of vibration of the conductors is dissipated in the frictional engagement between a bearing and a bearing plate. The bearing is activated by a conductor arm that connects with a vibrating conductor at one end and with a coil spring adjacent its other end. The coil spring is adapted to respond to the vibration of the conductor arm, both tortionally and axially, and as it does so, the bearing and bearing plate frictionally engage to dissipate the energy of the applied vibration and thereby dampen it.

---

This invention relates to a spacer damper for the spaced apart conductor cables of an electricity transmission line.

It is fairly common practice to transmit electrical power over closely spaced apart conductor cables. These conductor cables usually carry electricity of the same phase and each form part of what is commonly known as a bundle conductor. Under conditions of wind, they tend to vibrate. There are different types of vibration. Aeolian vibration is a vibration that is caused by relatively light winds. It is of a relatively low amplitude and occurs in a vertical plane, usually in frequencies ranging from 5 to 70 cycles per second. Spacer dampers capable of suppressing most conditions of aeolian vibration have been developed.

In addition to aeolian vibration, there is a phenomenon known as subconductor oscillation. Subconductor oscillation is a wind excited oscillation encountered from time to time in exposed terrain and especially where larger conductors are used. It is though to be caused by the aerodynamic effect of the wind blowing across the windward conductor and causing wind forces on the leeward conductor. In exposed areas, these wind forces are sufficient in magnitude to cause subconductor oscillation. The ratio of conductor spacing to conductor diameter is thought to be a factor in the occurrence, but all contributing factors are not fully understood. The plane of vibration initially is apparently horizontal but often it develops into a combination of both vertical and horizontal motions. The amplitude of oscillation is sufficient, on occasion, to cause clashing among subconductors. The frequency of vibration is usually in the order of 1.5 cycles per second.

It is an object of this invention to provide a spacer damper that is capable of suppressing subconductor oscillation as well as aeolian vibration.

It is a further object of the invention to provide a spacer damper that is rugged and economical to manufacture.

With these and other objects in view, a spacer damper, according to this invention, comprises a frame, a plurality of conductor arms in said frame, each of said conductor arms having a cable clamp at one of its ends and a socket at its other end, a bearing plate on said frame, a bearing on each of said conductor arms, said bearing having a bearing surface in contact with said bearing plate, a coil spring between said socket and said frame, said coil spring being flexible about its axis in response to force applied at the clamp longitudinally of its respective conductor arm due to conductor vibration in use and being tortionally flexible in response to tortional force applied at the clamp of its respective conductor arm due to conductor vibration in use, said coil spring being loaded to maintain said bearing surface of said bearing in friction contact with said bearing plate under conditions of axial and tortional flexing thereof whereby energy of a force applied at the clamp of its respective conductor arm is dissipated in friction between said bearing surface of said bearing and said bearing plate.

The invention will be clearly understood after reference to the following detailed specification read in conjunction with the drawings.

In the drawings:

FIGURE 1 is a view illustrating a damper according to the invention in an operative position with respect to a pair of conductors which are illustrated in broken lines.

FIGURE 2 is an exploded view of one end of the damper, and

Figure 3:
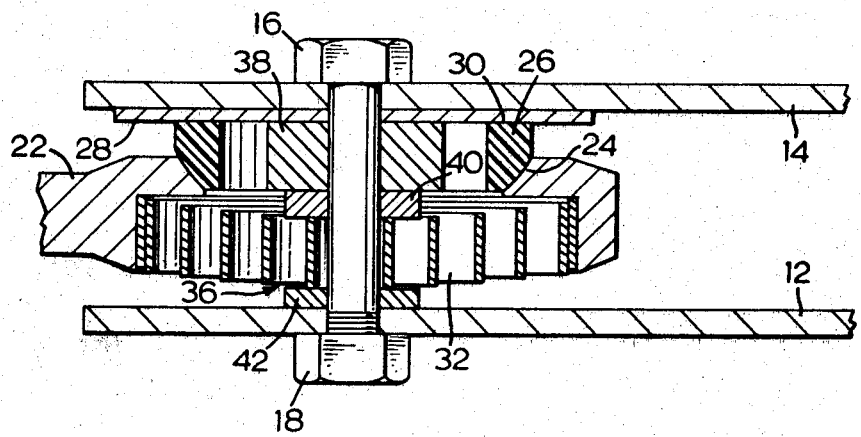
FIGURE 3 is a sectional view of one end of the damper.

In the drawings, the numeral 10 generally refers to a spacer damper according to this invention, that is adapted to maintain a pair of conductors of a transmission line in spaced apart relation and to dampen aeolian vibration and subconductor oscillation that may occur on them. It comprises a pair of spaced apart plates 12 and 14 held together by bolts 16 and nuts 18 and appropriate spacers and structure carried by the bolts 16, which will be referred to later The conductors, illustrated in FIGURE 1 in broken lines, are held in clamps 20 of conventional design on the free ends of conductor arms 22. The conductor arms 22 each have a socket 24 that engages in clutch relation with a Teflon bearing ring 26 under the influence of coil spring 32. A stainless steel bearing plate 28 rests against one of the plate members 14 and, in use, the bearing surface 30 of bearing ring 26 frictionally engages with the surface of the bearing plate 28, also under the influence of axially compressed coil spring 32, as will be referred to later.

It will be noted that the socket 24 of the conductor arms 22 is spherically formed to conform to the spherically formed contour of the bearing ring 26, with which it is in clutch arrangement. This provides for a universal movement between the two members to permit alignment of the conductors within the bracket with respect to each other in use.

A coil spring 32 is secured at its outer end 33 to the socket of the cable arm in a slot 34 and is clamped at its inner end to secure it rigidly with respect to the frame between spacers 40 and 42. It is axially compressed so that, in use, it is adapted to force the bearing surface 30 of the bearing plate 26 against the bearing plate 28 with a force sufficient to effectively dampen aeolian vibration and subconductor oscillation which manifests itself in forces that tend to rotate the conductor arm about the bolt 16 and which tend to move the conductor arm longitudinally of itself and through an axis through the bolt 16.

The nut 18 and the bolt 16 which extend between the plates 14 and 12 carry the conductor arms 22, plates 28 and bearings 26 in cooperative relation, and, in this respect, bearing plate 28 is rigidly maintained against the plate 14 by means of the spacer 38. Nut 18 is rigidly tightened on bolt 16 to securely clamp therebetween plate 14, plate 28, spacers 38 and 40, the inner end of spring 32, spacer 42 and plate 12.

The inside end of coil spring 32 is clamped as at 36 by spacers 40 and 42, and the outside end connects with the slot 34 in arm 22. Thus, the spring is secured at one end rigidly with respect to the frame and at the other end rigidly with respect to the arm 22 and may thereby be tortionally loaded. Arm 22 is, of course, free to turn about the bolt axis of bolt 16 subject to the spring loading.

It will be noted that spacer 38, apart from contributing to the stack of spacers to clamp the inner end of the spring 32, also serves to limit the amount of off-centre displacement of the spring as it is axially flexed by acting as a stop against the inner wall of the ring.

Spring 32 is a helical tortion type of coil spring and its axis is normally coincident with the axis of bolt 16. It is loaded to resist tortional flexing and, therefore, resist turning of the conductor arm 22 about the axis 16 of bolt 16. It also resists axial flexing about its axis. Thus, as it yields tortionally and axially of its own axis, it offers predetermined resistance to forces tending to turn the conductor arms and forces on the conductor arms having a resultant direction through and at right angles to the axis of the spring when it is in its normal position. The axial compression of the spring also forces the conductor arm transversely of the bracket into clutching engagement with the bearing ring 30, which, in turn, exerts a force against the bearing plate 28 with which it frictionally engages.

Thus, when the damper is operatively mounted on a transmission line, springs 32 are each axially flexible about their longitudinal axis in response to forces applied at the conductor clamp in a direction longitudinally of the conductor arm and tortionally flexible in response to tangential turning forces applied at the clamp and which tend to turn the clamp arm about the spring axis. It will be understood that the spring axis is the axis of the spring under no load conditions and it coincides with the longitudinal axis of the bolt 16. Aeolian and sub-conductor vibrations apply axial and tortional turning forces in use as will be referred to again.

At the same time, it will be recalled that the spring 32 is stressed axially of itself, as illustrated in FIGURE 3, to maintain the socket 24 of conductor arm 22 in clutch arrangement with the bearing 26 so that the appropriate amount of friction is generated between bearing plate 28 and bearing surface 30 of bearing 26. The axial compression of the spring is adjusted so that the friction force achieves a dissipation of the energy generated by the vibrations of the conductors as they are held in clamps 20 and that are to be suppressed. The amount of energy dissipated must be balanced to the energy applied in use by the vibrations concerned. There are, thus, two design parameters each of which is controllable according to the vibration severity. There is the friction force between the bearing surface of the bearing plate 28 and the bearing surface 30 of bearing ring 26, and there is the spring rate of spring 32 tending to urge the bearing plate and bearing surface together. The spring rate of spring in tortion and in axial deflection must be such that it is capable of storing and releasing the substantial part of the energy of the applied vibration. A certain amount of the energy of vibration will be dissipated in the friction of the spring but this is not a significant amount. By and large, the energy is dissipated in friction between the bearing and the plate. In effect, the spring stores and releases the substantial part of the energy as it is stressed in tortion and reasserts itself and is axially deflected and reasserts itself due to conductor vibration and the resulting friction between friction plate and bearing ring dissipates the energy of conductor vibration. This results in a dampening of the vibration.

In use, the conductor vibrations to be dampened can be considered as consisting of a component that is tangential to the arc described by the clamp 20 as it rotates about the spring axis and a component that passes through the clamp and the axis of rotation, i.e., the longitudinal axis of the clamp arm. The tangential component will tortionally activate the spring while the component that is through the longitudinal axis of the clamp arm will axially activate the spring. Aeolian vibration carries the conductor arm substantially in a vertical direction and, if the conductor arm is in the position of FIGURE 1, the largest component of aeolian vibration would be tangential. It would tend, therefore, primarily to tortionally vibrate the spring. Subconductor vibration, on the other hand, is in more of a horizontal direction. The major component of subconductor vibration would be along the axis of the clamp arm for the position shown in FIGURE 1, and it would, therefore, tend to substantially axially vibrate the spring. Flexing of the spring, either tortionally or axially, however, has the effect of moving the bearing 26 over the bearing plate 28 and the frictional engagement of these two parts resulting from the application of vibration to the clamps is adapted to dampen the clamp and hence vibration.

It will be apparent that by providing a spring capable of storing and releasing tortional and axial stress and that, at the same time, exerts a force on a bearing whereby friction results that is capable of dissipating the energy that caused the tortional and axial vibration on the spring, there has been provided a damper capable of dampening both aeolian and subconductor vibration. The damper is both rugged and efficient.

It will be appreciated that in the foregoing description, one end only of the clamp has been described in detail and that the other end is identical.

Embodiments of the invention other than the one illustrated will be apparent to those skilled in the art and it is not intended that the foregoing specification be read in a limited sense. For example, in the embodiment shown, the spring is loaded or compressed axially to maintain the bearing and bearing plate in the necessary frictional engagement to dissipate the energy of vibration. Other means, independent of the spring illustrated, may be added to achieve this function of urging these two parts together to achieve the desired frictional contact.

What we claim as our invention is:

1. A spacer damper comprising a frame, a plurality of conductor arms in said frame, each of said conductor arms having a conductor clamp at one of its ends and a socket at its other end, a bearing plate on said frame, a bearing on each of said conductor arms, said bearing having a bearing surface in friction contact with said bearing plate, a coil spring between said socket and said frame, said coil spring being axially flexible about its axis in response to force applied at a clamp longitudinally of its respective conductor arm due to conductor vibration in use, and being tortionally flexible in response to turning force applied at the clamp of a respective conductor arm due to conductor vibration in use, said coil spring being loaded to maintain said bearing surface of said bearing in friction contact with said bearing plate under conditions of axial and torsional flexing thereof to dissipate energy of vibration whereby energy of forces applied at the clamp of its respective conductor arm are dissipated in friction between said bearing surface of said bearing and said bearing plate.

2. A spacer damper, as claimed in claim 1, in which said bearing on said conductor arms is formed separately from said conductor arms and is maintained in clutch relation with its respective conductor arm.

3. A spacer damper, as claimed in claim 2, in which said bearing is maintained in clutch relation with its respective conductor arm by axial compression of said coil spring.

4. A spacer damper, as claimed in claim 2, in which each conductor arm and its respective bearing is adapted for universal movement with respect to each other, to permit alignment of conductors supported by said plurality of conductor arms in use.

5. A spacer damper comprising a frame, a plurality of conductor arms in said frame, each of said conductor arms having a conductor clamp at one of its ends and a socket at its other end, a bearing plate on said frame, a bearing on each of said conductor arms, said bearing having a bearing surface in friction contact with said bearing plate, a coil spring between said socket and said frame, said coil spring being axially flexible about its axis in response to force applied at a clamp longitudinally of its respective conductor arm due to conductor vibration in use, and being torsionally flexible in response to turning force applied at the clamp of a respective conductor arm due to conductor vibration in use, means for maintaining said bearing surface of said bearing in friction contact with said bearing plate under conditions of axial and torsional flexing of said spring to dissipate energy of vibration whereby energy of forces applied at the clamp of its respective conductor arm are dissipated in friction between said bearing surface of said bearing and said bearing plate.

References Cited
UNITED STATES PATENTS

| | | | |
|---|---|---|---|
| 2,973,402 | 2/1961 | Taylor | 174—146 X |
| 3,039,133 | 6/1962 | Milton et al. | 188—102 X |

FOREIGN PATENTS

| | | |
|---|---|---|
| 827,743 | 2/1960 | Great Britain. |
| 1,084,102 | 9/1967 | Great Britain. |
| 1,098,813 | 1/1968 | Great Britain. |

LARAMIE E. ASKIN, Primary Examiner

U.S. Cl. X.R.

174—146; 188—1, 102